United States Patent [19]

Jane et al.

[11] Patent Number: 5,523,293

[45] Date of Patent: Jun. 4, 1996

[54] SOY PROTEIN-BASED THERMOPLASTIC COMPOSITION FOR PREPARING MOLDED ARTICLES

[75] Inventors: Jay-Lin Jane; Shuhuan Wang, both of Ames, Iowa

[73] Assignee: Iowa State University Research Foundation, Inc., Ames, Iowa

[21] Appl. No.: 248,994

[22] Filed: May 25, 1994

[51] Int. Cl.$^6$ .............................. A61K 38/00; D01F 4/00; A23J 1/00

[52] U.S. Cl. .................. 514/21; 530/350; 530/356; 530/357; 530/360; 530/362; 530/370; 530/372; 530/373; 530/374; 530/378; 106/124; 106/150; 106/154.1; 264/202; 264/204; 264/209.1; 264/209.3; 264/209.5; 426/331; 426/634; 426/656; 426/657

[58] Field of Search ................... 514/21; 530/350, 530/356, 357, 360, 362, 370, 372, 373, 374, 378; 106/124, 150, 154.1; 264/202, 204, 209.1, 209.3, 209.5; 426/331, 634, 656, 657

[56] References Cited

U.S. PATENT DOCUMENTS 3,123,653  3/1964  Lieberman ..................... 264/99
3,329,509  7/1967  Julius .............................. 99/171
3,413,129  11/1968  Lieberman ..................... 99/176
3,615,715  10/1971  Mullen ........................... 99/176
3,965,268  6/1976  Stocker et al. ............... 426/331
4,976,982  12/1990  Gillmore et al. ............. 426/557

FOREIGN PATENT DOCUMENTS 2214920  9/1989  United Kingdom.
WO93/19125  9/1993  WIPO.

*Primary Examiner*—Michael G. Wityshyn
*Assistant Examiner*—Abdel A. Mohamed
*Attorney, Agent, or Firm*—Merchant, Gould, Smith, Edell, Welter & Schmidt

[57] ABSTRACT

The invention provides biodegradable, thermoplastic compositions made of the reaction product of soybean protein and a carbohydrate filler, a reducing agent, a plasticizer, water, and optional additives as desired. The composition has a high degree of flowability for processing by extrusion and injection molding into solid articles that are biodegradable with a high degree of tensile strength and water resistance.

25 Claims, No Drawings

SOY PROTEIN-BASED THERMOPLASTIC COMPOSITION FOR PREPARING MOLDED ARTICLES

STATEMENT REGARDING SPONSORED RESEARCH

The invention described herein was made with the assistance of the American Soybean Association and the United Soybean Board, St. Louis, Mo. These organizations have certain rights in the invention.

BACKGROUND OF THE INVENTION

Attempts have been made to produce formed articles that are biodegradable from various types of proteinaceous material. An example of one such protein material is soy protein, particularly in the form of soy isolates and soy concentrates. Although soy protein has shown excellent plastic properties, this material does not possess a level of flowability that enables it to be readily processed by conventional equipment. As a result, soy-protein plastics have been traditionally made by compression molding.

Other efforts toward improving the processing of soy protein include treating the protein with a reducing agent to enhance the dispersibility of the protein in the mixture. Such agents function to reduce (cleave) disulfide (—S—S—) bonds in the protein molecule or polypeptide to form —SH groups, thus increasing the dispersibility of the protein. In one such example, U.S. Pat. No. 3,615,715 to Mullen, the authors describe forming films by the extrusion of a mixture made of a nonheat coagulable simple protein (i.e., wheat gluten, keratin, soybean protein), a reducing agent (i.e., an alkali metal sulfite), and particulate silica or silicate. Such mixtures include a high level of plasticizer to reduce the viscosity of the material and facilitate processing and extrusion.

Although useful in making films by extrusion, these mixtures do not have the structure or strength for forming solid articles by conventional thermoplastic processing techniques such as extrusion and injection molding.

Therefore, an object of the invention is to provide a thermoplastic material made of soybean protein that possesses a high level of flowability for processing the material into molded, solid plastic articles by extrusion and injection molding, and other like molding processes. Another object is to provide a soy protein thermoplastic composition that can be formed into solid, biodegradable articles having an increased level of tensile strength and elongation. Yet another object is to provide articles formed of a soy protein composition that are highly water-resistant, being capable of tolerating exposure to water over an extended period of time with minimal or no disintegration. Another object is to provide a low-cost biodegradable plastic for use in making formed articles.

SUMMARY OF THE INVENTION

These and other objects are achieved by the present invention which is directed to a biodegradable thermoplastic composition made of soybean protein combined with a reducing agent, a starch filler, plasticizer, water, and optional additives as desired. The composition may be used for making solid, molded articles that are biodegradable and possess a high degree of tensile strength and water resistance that are prepared, for example, by extrusion compounding and injection molding.

It has been advantageously found that a thermoplastic composition for use in making injection molded articles may be formulated from soybean protein, alone or combined with another proteins such as gluten, by reacting the protein with a reducing agent, and combining the protein with starch and cellulose fiber filler, a plasticizer, and water. Injection molded products made from the present composition display a high degree of tensile strength of about 20 MPa and a percentage elongation at break of about 18%. The composition is useful in producing biodegradable containers, food service utensils, golf tees and other outdoor sporting articles, among other articles.

The thermoplastic composition is made of the reaction product of about 25–65 wt-% soybean protein alone or combined with gluten or other protein, about 0.5–2.5 wt-% reducing agent such as sodium sulfite or sodium bisulfite, about 30–40 wt-% starch filler; about 5–35 wt-% glycerol or other like plasticizer, and about 5–25 wt-% water. The composition may include additives as desired, as for example, soybean oil, lecithin or other suitable lubricating agent, a cellulosic extender, a hydrocolloidal gum such as locust bean gum or carrageenan, a preservative, and/or a coloring agent.

The compositions are prepared by high speed, high shear mixing at an elevated temperature to melt the protein mixture, with extrusion processing being preferred. The dried extrudate is processed, for example, by injection molding, to make solid, molded articles that are biodegradable and have a high degree of tensile strength and water resistance, preferably by an injection molding process.

DETAILED DESCRIPTION OF THE INVENTION

The thermoplastic composition of the present invention is composed of a high amount of soy protein treated with a reducing agent and combined with a starch filler, plasticizer, water, and additives as desired. Preparation of the thermoplastic composition is at high temperature in a high speed, high shear mixer, preferably an extruder. The extrudate may be used for preparing articles by injection molding or other high temperature molding process. The resulting articles possess a high degree of tensile strength and low water absorbance.

As used herein, unless otherwise noted, the wt-% of the components of the composition are based on the total weight of the composition.

Protein Source. The composition is formulated with soybean protein, alone or combined with a compatible plant or animal proteinaceous material. The composition contains about 25–65 wt-% soy protein, preferably about 30–60 wt-%, preferably about 35–55 wt-%.

The soy protein may be in the form of a soy isolate containing at least about 90% protein, a soy protein concentrate containing at least about 70% protein, or soy flour containing at least about 50% protein. The soy protein isolate or concentrate may be prepared, for example, by alkaline extraction of a defatted meal and acid precipitation, a technique known and used in the art. Soy protein is also commercially available, for example, as Promine R (Central Soya) which is a soy isolate having a protein content of approximately 95 wt-%. Other soy protein products are also available from ADM, Decatur, Ill. and Protein Technology, St. Louis, Mo.

The soy protein may be used alone or in combination with a plant-, animal- or microbe-derived protein. Suitable plant-derived proteins include gluten, zein, hordein, kafirin, avenin, and the like. Gluten protein may be derived from wheat, corn, oats, rice, and the like, with wheat gluten being preferred. Animal-derived proteins that are suitable for use in the present composition include, for example, casein derived from milk, albumin derived from blood or egg, collagen, gelatin, keratin, and other like protein-containing substances. Microorganisms, such as beer yeast and baker's yeast, among other organisms, may also be combined with the soy protein in the present compositions.

Reducing Agent. The composition is formulated with a reducing agent for enhancing the dispersibility of the protein in the mixture, for processing the soy protein composition in the mixer (i.e., extruder), and forming the protein composition into solid, molded articles by injection molding or other like process.

Processing of soy protein by extrusion and injection molding to form solid articles has proven difficult prior to the present invention. It was surprisingly found that the present combination of soy protein with a reducing agent and a starch filler and plasticizer, achieves a thermoplastic mixture that may be processed by extrusion to produce solid pellets that may be formed into useful articles by injection molding and other molding techniques.

The reducing agent may be a sulfhydryl reducing agent that contains —SH groups, or other compound capable of initiating reactions which reduce (cleaving) the disulfide (—S—S—) bonds in the protein molecule or polypeptide to form —SH groups, thus increasing the dispersibility of the protein. Sulfydryl reducing agents increase the solubility or dispersibility of the protein by breaking various disulfide bonds within the polypeptide chains (intrachain) and/or in the cross-linking of different polypeptide chains (interchain). Useful reducing agents include, for example, a mercaptan such as mercaptoethanol, cysteine, L-cysteine hydrochloride, cysteamine, L-cysteine tartrate, di-L-cysteine sulfite, and the like; ascorbic acid (ascorbic palmatate); ammonium sulfite; alkali metal sulfites, bisulfites and nitrites such as sodium or potassium sulfite, sodium or potassium bisulfite and sodium nitrite, hydrosulfite and pyrosulfite salts, and the like; hydrogen sulfide; glutathione; and the like. Preferred reducing agents are sodium sulfite, ascorbic acid, and sodium bisulfite. Sodium sulfite and bisulfite may also act to lighten the color of the products. Preferably, the composition includes about 0.5–2.5 wt-% of a reducing agent, preferably about 1–2 wt-%.

Starch Filler. The composition is formulated to contain a starch filler to provide better flowability, better water resistance (reduced water absorption) and to decrease product cost. Preferably, the soy protein (wt-%) is combined with about 30–40 wt-% starch filler, preferably about 25–35 wt-%, preferably about 20–30 wt-%.

The starch filler may be a native (unmodified) starch isolated from a natural starch source such as corn including maize, waxy maize and high amylose corn; wheat including hard wheat, soft wheat and durum wheat; rice including waxy rice; rye, oat, barley, sorghum, millet, triticale, amaranth, potato, tapioca, mung bean, sweet potato, and the like. The starch may be a normal starch (about 20–30 wt-% amylose), a waxy starch (about 0–8 wt-% amylose), or a high-amylose starch (greater than about 50 wt-% amylose).

The filler may also be a chemically-modified, derivatized starch such as starch acetate, starch propionamide, starch maleate, starch octenylsuccinate, carboxymethyl starch, hydroxyethyl starch, hydroxypropyl starch, methyl starch, ethyl starch, methyl hydroxyethyl starch, ethylhydroxypropyl starch, starch phosphate, oxidized starch, cationic starch, starch succinate, and the like.

Also useful as a filler is a pregelatinized starch, a cold water-soluble starch, or other physically modified starch.

Plasticizer. The composition further includes an effective amount of a plasticizing agent to impart flexibility to the material before and during and after mixing, and to provide flexibility, elasticity, and processability to the formed article. The composition is formulated with about 5–35 wt-% plasticizer, preferably about 10–30 wt-%, preferably about 15–25 wt-%.

Suitable plasticizing agents useful in the present composition include polyols and higher molecular weight alcohols, for example, glycerol, glycerol monoacetate, diglycerol, glycerol diacetate or triacetate, triethylene glycol, urea, diacetin sorbitol, sorbitan, mannitol, maltitol, ethylene glycol, propylene glycol, polyvinyl alcohol, sodium cellulose glycolate, cellulose methyl ether, sodium alginate, sodium diethylsuccinate, triethyl citrate, polyethylene glycols, polypropylene glycols, polyethylene propylene glycols, 1,2, 6-hexanetriol, triethanolamine, and mixtures thereof, with glycerol being preferred.

Water. The composition further includes about 5–25 wt-% water to add moisture and facilitate processing of the compositions, preferably about 8–20 wt-%, preferably about 10–15 wt-%.

Additives. The soy protein-based thermoplastic composition may further include additives as desired. Useful additives include, for example, a lubricating agent, extender, flavoring agent, coloring agent, preservatives, among others.

Lubricants. The composition may contain a minor but effective amount of a lubricating agent to provide a mold-or dye-lubricating effect when the composition is molded into the desired article, for example, by aiding in the release of the molded article from the mold. Water-insoluble lubricants may also increase the water-resistance of the products.

Examples of suitable lubricants that may be used in the compositions, either alone or in combination with another lubricant, include soybean oil, phospholipids such as lecithin, mono- and diglycerides, and fatty acids, preferably saturated fatty acids; vegetable oil, preferably hydrogenated forms, phosphoric acid-derivatives of the esters of polyhydroxy compounds, animal lipids, preferably hydrogenated forms to prevent thermal oxidation, petroleum silicone and mineral oils, and the like. Preferred lubricants are soybean oil and lecithin. The amount of lubricant included in the composition is about 0.1–2 wt-%, preferably about 0.5 to 1.5 wt-%.

Extenders. The composition may also include an extender to provide structural reinforcement to enhance mechanical properties such as tensile strength, yield strength, and to increase water resistance and to reduce product costs. Where included, the composition may contain about 1–25 wt-% of an extender, preferably about 5–20 wt-%, preferably about 10–15 wt-%.

The extender may be a cellulosic material, including cellulose derivatives such as methylcellulose, carboxymethylcellulose, hydroxymethylcellulose, and hydroxypropylcellulose and sodium carboxymethylcellulose; microcrystalline cellulose; and/or a cellulose fiber. The extender may also be a synthetic polymers such as a poly(acrylic acid), poly-(methacrylic acid), poly(vinyl acetate), poly(vinyl alcohol), and poly(vinyl acetate phthalate), among others. Preferably, the extender is a cellulose derivative, or a cellulose fiber with a short-fiber cellulose preferred.

Fillers. One or more gums may be added as a processing aid to improve tensile strength, hardness, surface gloss and heat stability. Useful gums include, for example, locust bean gum, xanthan gum, guar gum, carrageenan, among others. Although not preferred, sodium alginate, gelatin, agar-agar and pectin may also be used. The composition may include about 1–5 wt-% of one or more stabilizer gums as plasticizers, preferably about 2–4 wt-%.

pH Modifier. The composition may further include citric acid, propionic acid, lactic acid, acetic acid, and other like acids, to improve the wet strength of the injection molded article. The acid is included in an amount effective to adjust the mixture to about pH 4.5 which is the isoelectric point (PI) of soy protein. At its PI, soy protein has the least charge and is the most water resistant.

Preservatives. A compatible antimicrobial agent such as a fungicide or bactericide may also be included in the composition in an amount effective to prevent growth of fungi, bacteria and the like, in or on the compositions or an article formed from the compositions. Examples of useful preservatives include sodium salts of propionic or sorbic acid, sodium diacetate, parabens, vinegar, monocalcium phosphate, lactic acid, and the like, and mixtures thereof. The composition may include about 0.05–0.3 wt-% preserving agent.

Colorants. The compositions may further include a coloring agent as desired. Coloring agents, suitable for use in the present compositions include, for example, azo dyes such as Bismarck Brown 2R and Direct Green B; natural coloring agents such as chlorophyll, xanthophyll, carotene, and indigo; and metallic oxides such as iron or titanium oxides. The coloring agent may be included in the composition at a concentration of about 0.001 to 10 wt-%, preferably about 0.5 to 3 wt-%.

Preparation of Thermoplastic Compositions and Formed Articles. The soy protein compositions are mixed together and formed into a desired article according to conventional processing techniques known in the art for preparing molded thermoplastic articles.

In brief, the soy protein compositions are prepared by mixing the ingredients together in a continuous mixing system at high speed, high shear, and high temperature. About 100 parts soybean protein in the form of soybean protein concentrate or isolate, is combined with about 1–4 parts of a reducing agent, preferably about 1.5–2.5 parts, with sodium sulfite, ascorbic acid, and sodium bisulfite being preferred; about 25–100 parts starch, preferably about 40–70 parts; about 30–60 parts plasticizer, preferably about 40–55 parts with glycerol being preferred; and about 15–40 parts water, preferably about 20–25 parts. One or more additives may be added to those ingredients as desired. For example, the composition may be formulated with about 2.5–3.0 parts of a lubricating agent, with soybean oil being preferred; about 10–20 parts of one or more gums as additional fillers, preferably about 12–18 parts, with carrageenan and locust bean gum being preferred; and/or up to about 75 parts of a cellulosic extender, with a short fiber cellulose being preferred.

A preferred composition is formulated to include about 35–55 wt-% soy protein isolate; about 1–2 wt-% of a reducing agent, preferably sodium sulfite, sodium bisulfite or ascorbic acid; about 20–30 wt-% starch filler which is preferably native corn starch, starch maleate, starch octenylsuccinate, starch succinate, potato starch, and/or starch phosphate; about 15–25 wt-% plasticizer, preferably glycerol; and about 10–15 wt-% water. The composition may further include about 0.5 to 1.5 wt-% lubricating agent which is preferably soybean oil or lecithin; about 2–4 wt-% of a gum which is preferably locust bean gum or carrageenan; about 10–15 wt-% of a cellulosic extender preferably a short fiber; about 0.001–1 wt-% preservative; and about 0.05–5 wt-% coloring agent.

The mixing system may be a continuous flow mixer such as a Teledyne continuous processor or a Breadsley Piper continuous mixer, and the like, or more preferably, a twin screw extruder apparatus, with a twin-screw extruder being highly preferred, as for example, a multiple section Buhler Miag twin screw extruder, a Brabender type PL 2000 extruder, and the like. The ingredients are mixed together at high shear to form a substantially homogeneous consistency with the ingredients distributed substantially evenly throughout.

For example, the ingredients may be processed in an extruder by feeding the ingredients into a first barrel of a multiple barrel extruder, mixing the ingredients to a plasticized consistency, extruding the mixture through a discharge port or die, and then sectioning the extrudate into pieces. In a preferred method, the ingredients are processed in an extruder which has multiple barrel sections with means for mixing the ingredients with varying temperature, pressure and shear, and a screw for conveying the mixture through the extruder to the discharge port. The extrusion conditions, for example, the screw configuration, elements, pitch and speed, the barrel temperature and pressure, the shear and throughput rate of the mixture, the die hole diameter, feed rate of the ingredients, and other conditions, may be varied in each barrel section as desired to achieve effective mixing of the ingredients to form a substantially homogeneous semi-solid mixture in which the ingredients are distributed evenly throughout.

In the extruder, the action of the rotating screw or screws will mix the ingredients and force the mixture through the sections of the extruder with considerable pressure. A useful extruder for processing the soy protein composition is a Brabender type PL 2000 extruder which has three zones in which heat can be applied to the ingredient mixture. The amount of heat applied is suitable for thorough mixing and reacting of the ingredients. The plastic composition is extruded through the discharge port or die into air or other gaseous medium. The extrudate is then sectioned into pellets of desired size, dried, and either stored for use at a later time or used in an injection molding process to form a biodegradable, soy protein thermoplastic product. The extruded mixture solidifies within a few minutes, depending, for example, on the size of the extruded portion, the ingredients of the composition, the temperature of the composition, and other like factors.

After mixing, the molten protein mixture is discharged from the mixing system, and either directly used in a molding system (i.e., injection molding), or allowed to adjust the moisture content for later use. The discharged material (i.e., extrudate) may be sectioned into pellets or other small pieces, and dried. The protein material may be processed into a solid article, for example, by injection molding process wherein an amount of the plastic composition in melted form is forced into a mold and maintained under pressure until cool; by compression molding wherein direct pressure is applied using a hydraulic press on an amount of the composition contained in a cavity; by blow molding wherein a tube of the thermoplastic composition is extruded into a mold and air pressure is applied to the inside of the tube to conform it to the mold and form a hollow article; and by other methods such as, transfer molding, vacuum forming, pressure forming, and inflation molding, or other suitable molding technique.

In a preferred method, the soy protein thermoplastic composition is processed into a molded article by injection molding. The protein material may be in the form of solid pellets that are heated to a molten state (about 120°–150° C.) having a water content of about 8–15%, and injected under pressure of about 880–1700 kg/cm$^2$ and a temperature of about 120°–160° C., into a mold (temperature of about 25°–40° C.). After the plastic is cooled and solidifies, the molding unit is opened and an article having a shape of the mold cavity is obtained.

The present compositions may be molded to provide solid articles of varying shapes, sizes and dimensions, that are useful in a variety of applications. Advantageously, products prepared with the soy protein composition display improved tensile strength and elongation properties, yield strength, and water resistance. The molded plastics retain a light color which is desirable for consumer products. Advantageously, the composition may be molded into a solid article including, for example a tray, bottle, tubing, dishware such as a cup or a plate, flatware such as a spoon, knife, fork or other eating utensil, or other like articles, a packaging for another article or substance such as foods, drugs and the like, that contain moderate amounts of water, and the like. The composition of the invention may also be molded or extruded to provide foamed products such as packaging, loose fills, foamed dishes and cups, and the like. Residual water in the composition may be suitably used as a blowing agent.

The compositions of the invention are useful for providing solid, molded articles that are biodegradable with a high degree of water-resistance, so that the article will remain structurally intact for an extended period of time upon exposure to water. Although the articles made from the composition of the invention will degrade over time when exposed to moisture, such as from the package contents, or from submersion in water or other direct contact with water, the articles have a higher resistance to such disintegration and will remain substantially intact for a more extended period of time than articles made from other starch-based thermoplastics.

The resulting plastics also possess an increased level of tensile strength, percent elongation rate and water resistance compared to their counterparts which are made from other soy protein mixtures. The products have a smooth texture. Advantageously, the thermoplastic compositions of the invention, and articles produced from the composition, possess a tensile strength of about 5–20 megapascals (MPa), preferably about 10–20 MPa, preferably about 15–20 MPa.

Apart from being biodegradable, the compositions may be comprised entirely of components that may be consumed at nontoxic levels by a mammal including humans, or other animal, so that articles molded from such compositions may be safely consumed by the animal. Such edible compositions would be useful for making, for example, a packaging article that may be consumed by the user along with the package contents, dishes and flatware that may be ingested following a meal, a food article for consumption by a human or other animal such as a snack food or a domestic pet or other animal food, or other articles where consumption of the article is desired. An edible composition according to the present invention, would include an edible flavoring agent such as cocoa, vanillin, fruit extracts such as strawberry and banana, and the like, to enhance the taste of an edible composition, and a coloring agent appropriate to the flavorant. The composition may also be nutritionally reinforced, as for example by the inclusion of vitamins or minerals. After being used, the food utensils, dishes, and containers also can be collected, pasteurized, ground, and made into products such as animal feed, soil conditioners, among others.

The invention will be further described by reference to the following detailed examples. These examples are not meant to limit the scope of the invention that has been set forth in the foregoing description. It should be understood that many variations and modifications may be made while remaining within the spirit and scope of the invention. The disclosure of the cited references are incorporated by reference herein.

The compositions that are set forth in the following examples, were molded into a standard dogbone-shaped article as described in the American Society for Testing and Materials (ASTM D 638-86). Tensile properties of the molded articles were tested according to ASTM standard method D 638-86 using an Instron Universal Testing System (Model 4052, Canton, Mass.). Percent water absorption was measured according to ASTM D 570-81 procedure.

EXAMPLE 1

Soy protein isolate with varying concentrations of plasticizer

Soy protein isolate has rigid, brittle physical properties and little flowability. The influence of plasticizer was evaluated for its ability to improve the mechanical properties of soy protein for making a compression molded article, a soy protein composition was formulated with and without glycerol, and with varying levels of glycerol.

Sample 1 was formulated with no glycerol as the Control, and Samples 2–4 were formulated with varying amounts of glycerol as a plasticizer, and water as secondary plasticizer, as shown below in TABLE 1.

TABLE 1[1]

| Sample | Soy Protein Isolate[2] | Water | Glycerol[3] | Mechanical Properties | | |
|---|---|---|---|---|---|---|
| | | | | Tensile Stress[4] (MPa) | Elongation[4] (%) | Water Absorption[5] 24 hr. (%) |
| 1 | 93 | 7.0 | 0 | 43.8 | 4.5 | 123.4 |
| 2 | 83.6 | 6.4 | 10 | 22.5 | 6.7 | 100.7 |
| 3 | 74.4 | 5.6 | 20 | 9.8 | 123.3 | 88.9 |
| 4 | 69.7 | 5.3 | 25 | 7.3 | 261.8 | 77.1 |

[1]Ingredients: wt-% based on total composition.
[2]Soy protein isolate = Archer Daniels Midland Company, No. 66-646 (Fisher Chemical).
[3]Glycerol (Fisher Chemical).
[4]ASTM D638-86 Procedure.
[5]ASTM D570-81 Procedure.

The ingredients for Samples 2 to 4 were mixed together in a mixing bowl at a speed of 250 rpm. Glycerol was added during mixing. The mixture was stirred for 25 minutes at 25° C. The mixture was compression molded into ASTM standard tensile bars (dogbone article) by using a compression molding press (Wabash Metal Products, Inc., Wabash, Ind.) at 6 tons psi, 140° C. for 6 minutes.

Tensile stress at breakage ("TS"; Mpa), and percent elongation at breakage ("PE"; %) were measured according to ASTM D 638-86 procedure.

EXAMPLE 2

Torque Rheological Properties of soy protein isolate composition with varying concentrations of plasticizer Material temperature (° C.), roller speed (rpm), and torque (mg) of soy protein isolate with and without glycerol and a lubricant were measured according to the method of ASTM D 3795-79. Data was processed using a Placti-Corder CL2000 with Brabender mixer measuring head. The samples and results are shown in TABLE 2, below.

The moisture content of the granulated composition prior to injection molding was measured by using a moisture analyzer (Model MA30, Sartorius). The granulates were injection molded by using a Boy Injection Molding Machine

TABLE 2[1]

| Sample | Soy Protein Isolate | Glycerol | Water | Lubricant[2] | Torque Rheological Properties | | | |
|---|---|---|---|---|---|---|---|---|
| | | | | | Material Temperature (°C.) | Mixer Temperature (°C.) | Roller Speed (rpm) | Torque (mg) |
| 1 | 80 | 0 | 20 | 0 | 90 | 98 | 16 | >5006 |
| 2 | 70 | 0 | 30 | 0 | 75 | 98 | 16 | 3500 |
| 3 | 70.2 | 25 | 4.8 | 0 | 91 | 130 | 16 | >11200 |
| 4 | 60.8 | 35 | 4.2 | 0 | 73 | 130 | 16 | 3200 |
| 5 | 51.4 | 14.9 | 33.2 | 0.5 | 78 | 130 | 16 | 1500 |

[1]Ingredients: wt.-% based on total composition; ingredient sources same as listed in Table 1, except for lubricant.
[2]Lubricant: Stearic Acid (Mallinckrodt, Inc.).

Compositions containing soy protein isolate without glycerol were physically rigid and brittle with little flowability. The torque of the soy protein isolate alone was over 10,000 mg.

The torque was reduced to 1500 mg by the addition of glycerol as plasticizer, water as secondary plasticizer, and a minor amount of lubricant. Those compositions were significantly more flexible with improved physical properties and flowability. Glycerol significantly increased the strain and decreased the water absorption of the molded articles. The processing flowability of soy protein isolate composition was also significantly improved.

EXAMPLE 3

Compositions with soy protein and corn starch filler with varying amounts of glycerol Compositions containing soy protein isolate were formulated with corn starch as a filler (100 parts soy protein concentrate: 66.5 parts corn starch) with varying amounts of glycerol, as shown in TABLE 3 below.

TABLE 3[1]

| Sample | Soy Protein Isolate[2] | Water | Glycerol[3] | Starch[4] | Sodium[5] Sulfite | Soy Bean[6] Oil |
|---|---|---|---|---|---|---|
| 1 | 100 | 45.7 | 35.6 | 66.5 | 3.6 | 2.5 |
| 2 | 100 | 37.5 | 40.0 | 66.5 | 3.5 | 2.5 |
| 3 | 100 | 38.7 | 46.4 | 66.5 | 3.6 | 2.5 |
| 4 | 100 | 39.9 | 53.2 | 66.5 | 3.7 | 2.6 |

[1]Ingredients: by parts based on soy protein isolate as 100 parts.
[2]Soy protein isolate = Archer Daniels Midland Company, No. 66-646.
[3]Glycerol (Fisher Chemical).
[4]Starch (Normal maize starch, American Maize Products Company, Hammond, IN).
[5]Sodium sulfite (Fisher Chemical).
[6]Soybean oil (Sigma Chemical Co.).

The ingredients were mixed together in a mixer bowl at a speed of 250 rpm. Soy protein isolate was pretreated with a sodium sulfite solution. The treated soy protein isolate was then blended with starch, and a mixture of glycerol, water and soybean oil was added to the protein/starch mixture under stirring. The mixed ingredients were fed through a hopper into a Brabender counterrotating twin-screw extruder (Model PL 2000). The extrudate was then granulated by using a Brabender pelletizer.

(Model 22S). Physical properties of the injection molded articles made from compositions in TABLE 3 are shown in TABLE 4 below.

Articles having the best physical properties were found in the compositions containing the higher amounts of glycerol, i.e., 46–53 parts, as shown in TABLE 4 below.

TABLE 4

| Sample | Soy Protein Isolate: Glycerol (Parts) | Moisture Content of Granulates (%) | Mechanical Properties | | |
|---|---|---|---|---|---|
| | | | Tensile Stress (MPa) | Elongation (%) | Young's Modulus (MPa) |
| 1 | 100:35.6 | 7.19 | 9.81 | 3.59 | 686.47 |
| 2 | 100:40.0 | 7.00 | 9.21 | 5.60 | 413.55 |
| 3 | 100:46.4 | 7.06 | 8.55 | 9.48 | 409.72 |
| 4 | 100:53.2 | 7.26 | 8.90 | 10.47 | 293.91 |

The results indicate that when other ingredients remain constant, increases of the glycerol content decrease the tensile stress but increase the percent elongation of the molded articles.

EXAMPLE 4

Compositions with soy protein, corn starch and glycerol with varying amounts of moisture Compositions were formulated with soy protein isolate, corn starch (100 parts soy protein concentrate: 66.5 parts corn starch) and 29.6 parts glycerol, and 44.3 parts water, as shown in TABLE 5 below.

TABLE 5[1]

| Sample | Soy Protein Isolate | Water | Glycerol | Corn Starch[2] | Sodium Sulfite | Soy Bean Oil |
|---|---|---|---|---|---|---|
| 1 | 100 | 44.3 | 29.6 | 66.5 | 3.4 | 2.5 |
| 2 | 100 | 44.3 | 29.6 | 66.5 | 3.4 | 2.5 |
| 3 | 100 | 44.3 | 29.6 | 66.5 | 3.4 | 2.5 |

[1]Ingredients: by parts of total composition; ingredient sources are same as listed in Table 3, except for corn starch.
[2]Starch (American Maize Products Company; food corn starch).

The ingredients were mixed together as described in Example 3 above. The moisture content of the mixed granulates was measured by a moisture analyzer. The granulates were injection molded into articles, and physical properties measured as described in Example 3 above.

Articles having the best physical properties were found in the compositions that had a moisture content of under 10%, as shown in TABLE 6 below.

TABLE 6

| Sample | Moisture Contents of Granulates (%) | Mechanical Properties | | |
|---|---|---|---|---|
| | | Tensile Stress (MPa) | Elongation (%) | Young's Modulus (MPa) |
| 1 | 17.7 | 5.20 | 53.42 | 126.11 |
| 2 | 12.2 | 7.53 | 31.81 | 189.46 |
| 3 | 7.6 | 8.40 | 7.26 | 386.97 |

Results indicated that articles prepared with low moisture content displayed great tensile stress and Young's Modulus. The articles also displayed good hardness and dimensional stability.

EXAMPLE 5

Soy protein composition with increased glycerol level

A composition was formulated with soy protein isolate, corn starch, glycerol, soybean oil, and sodium sulfite as a reducing agent, as shown in TABLE 7 below.

TABLE 7[1]

| Sample | Soy Protein Isolate[2] | Corn Starch | Glycerol | Water | Sodium Sulfite | Soy Bean Oil |
|---|---|---|---|---|---|---|
| 1 | 100 | 66.5 | 53.2 | 39.9 | 3.7 | 2.6 |

[1]Ingredients: by parts of total composition; ingredient sources are same as listed in Table 5.

The ingredients were mixed together in a Brabender counterrotating twin screw extruder (Model PL 2000 plasticcorder with a twin screw mixer) having three barrels (zones): temperature zone 1/zone2/zone 3/zone die—110/125/116/102° C., respectively, at screw speed 14 rpm. The extrudate was granulated and dried at 50°–60° C. for 6–8 hours. The moisture content of the granulates was measured by a Moisture Analyzer (model MA30 Saxtorius) at 100° C. for 6 minutes. The moisture content of the granulates was 7.26%.

To process the granulates into a formed article, the granulates were fed through a hopper to an injection molding machine by injection molding (model, Boy22s): temperature zone 1/zone 2=135/140° C., at screw speed 40 rpm and 1645 bar pressure.

The physical properties of the formed article were measured as described in Example 3 above. The results are shown in TABLE 8 below.

TABLE 8

| Sample | Mechanical Properties | | |
|---|---|---|---|
| | Tensile Stress (MPa) | Elongation (%) | Young's Modulus (MPa) |
| 1 | 8.92 | 10.47 | 293.91 |

When the glycerol content was increased from 29.6 parts to 53.2 parts, the molded articles displayed improved tensile strength and higher elongation. Sodium sulfite also lightened the color of the articles.

EXAMPLE 6

Composition with soy protein concentrate and ascorbic acid reducing agent

A composition was formulated with soy protein concentrate, corn starch, glycerol, and stearic acid (lubricant) and ascorbic acid (reducing agent), as shown in TABLE 9 below.

TABLE 9[1]

| Sample | Soy Protein Concentrate[2] | Corn Starch | Glycerol | Water | Stearic Acid[3] | Ascorbic Acid[4] |
|---|---|---|---|---|---|---|
| 1 | 100 | 42.7 | 25 | 37.5 | 1.6 | 1.6 |

[1]Ingredients: by parts of total composition; corn starch and glycerol sources same as listed in Table 3.
[2]Soy protein concentrate (Archer Daniels Midland Company).
[3]Stearic Acid (Mallinckrodt, Inc.).
[4]Ascorbic Acid (Sigma Chemical Co.).

The ingredients were mixed together in a Brabender counterrotating twin screw extruder (Model PL 2000 plasticcorder with a twin screw mixer) extruder: temperature zone 1/zone 2/zone 3/zone die—110/120/115/98° C. at screw speed 16 rpm. The extrudate was dried, granulated, and the moisture content measured as described in Example 5 above. The moisture content of the granulates was 9.57%.

The granulates were processed by injection molding into a formed article as described in Example 5: temperature zone 1/zone 2=120/145° C., at screw speed 40 rpm and 1558 bar pressure.

The physical properties of the formed article were measured as described in Example 3 above. The results are shown in TABLE 10 below.

TABLE 10

| Sample | Mechanical Properties | | |
|---|---|---|---|
| | Tensile Stress (MPa) | Elongation (%) | Young's Modulus (MPa) |
| 1 | 8.73 | 6.36 | 397.17 |

Soy protein concentrate, which contains more than protein, can be used to replace soy protein isolate (90% protein) for the plastic products to reduce the cost. Articles made from soy protein concentrate and ascorbic acid displayed good mechanical properties as well.

EXAMPLE 7

Injection molding of soy protein compositions prepared with reducing agent and various starches Compositions were formulated with soy protein isolate, glycerol, water, sodium sulfite, and soy bean oil, and two types of starch, potato starch and wheat starch, as shown in TABLE 11 below.

TABLE 11[1]

| Sample | Starch Type[2] | Soy Protein Isolate | Starch | Glycerol | Water | Sodium Sulfite | Soy Bean Oil |
| --- | --- | --- | --- | --- | --- | --- | --- |
| 1 | Potato | 100 | 66.5 | 36.6 | 52.4 | 3.7 | 2.6 |
| 2 | Wheat | 100 | 66.5 | 36.6 | 52.4 | 3.7 | 2.6 |

[1]Ingredients: by parts of total composition; ingredient sources same as listed in Table 5, except starches.
[2]Potato starch and wheat starch (Sigma Chemical Company).

The ingredients were mixed together in a Brabender counterrotating twin screw extruder (Model pL 2000 plasticcorder with a twin screw mixer) extruder: temperature zone 1/zone 2/zone 3/zone die—110/127/125/115° C. at screw speed 15 rpm. The extrudate was granulated, dried, and the moisture content measured as described in Example 5 above.

The granulates were processed by injection molding into formed articles as described in Example 5: temperature zone 1/zone 2=135/140° C., at screw speed 40 rpm and 1558 bar pressure.

The physical properties of the formed articles were measured as described in Example 3 above. The results are shown in TABLE 12 below.

TABLE 12

| Sample | Moisture Contents of Granulates (%) | Tensile Stress (MPa) | Elongation (%) | Young's Modulus (MPa) |
| --- | --- | --- | --- | --- |
| 1 | 11.8 | 9.51 | 56.05 | 272.13 |
| 2 | 12.3 | 8.65 | 44.84 | 243.30 |

Results indicated that at the same ingredient composition and the same molding condition, potato starch produced better plastics than wheat starch. This can be attributed to phosphate derivatives of potato starch, which may enhance the interaction between the starch and protein.

EXAMPLE 8

Injection molding of soy protein compositions prepared with physically or chemically modified corn starch Compositions were formulated with soy protein isolate, glycerol, water, and pregelatinized starch (1), starch acetate (2), and octenylsuccinated corn starch (3), as shown in TABLE 13 below.

TABLE 13[1]

| Sample | Soy Protein Isolate | Physically or Chemically Modified Corn Starch | Glycerol | Water | Ascorbic Acid | Lecithin[5] | Sodium Sulfite | Soy Bean Oil |
| --- | --- | --- | --- | --- | --- | --- | --- | --- |
| 1 | 100 | 42.7[2] | 23.3 | 25.2 | 1.0 | 1.9 | — | — |
| 2 | 100 | 66.7[3] | 27.0 | 29.3 | — | 2.3 | — | — |
| 3 | 100 | 66.64 | 46.5 | 38.7 | — | — | 3.6 | 2.6 |

[1]Ingredients: by parts of total composition; ingredient sources same as listed in Table 3, except as indicated below.
[2]Instant corn starch, unmodified, pregelatinized common corn starch (American Maize and products, Hammond, IN).
[3]Polar Gel C, stabilized, moderately-inhibited, pregelatinized starch, starch acetate (American Maize and Products).
[4]OSA/Amioca starch (National Starch & Chemical Co., Bridgewater, NJ).
[5]Lecithin, purified grade (Fisher Chemical).

The ingredients were mixed together in a Brabender counterrotating twin screw extruder (Model PL 2000 plasticcorder with a twin screw mixer) extruder, at temperature zone 1/zone 2/zone 3/zone die, as follows: samples 1 and 2 at 110/120/105/98° C. at screw speed 15 rpm; sample 3 at 110/125/116/108° C. at screw speed 14 rpm. The extrudates were dried, granulated, and the moisture content measured as described in Example 5 above.

Each of the granulated compositions were processed by injection molding into formed articles as described in Example 5, at temperature zone 1/zone 2, as follows: sample 1 at 135/145° C.; sample 2 at 135/150° C.; and sample 3 at 120/150° C.; all at screw speed 40 rpm and 1558 bar pressure.

The physical properties of the formed articles were measured as described in Example 3 above. The results are shown in TABLE 14 below.

TABLE 14

| Sample | Moisture Contents of Granulates (%) | Tensile Stress (MPa) | Elongation (%) | Young's Modulus (MPa) |
| --- | --- | --- | --- | --- |
| 1 | 9.49 | 8.73 | 3.51 | 468.66 |
| 2 | 11.00 | 5.39 | 28.12 | 180.15 |
| 3 | 7.57 | 8.94 | 19.93 | 310.87 |

Chemically modified starches produced molded articles with greater percent elongation compared with unmodified starch. Octenylsuccinated starch produced plastics of good tensile strength and good elongation.

EXAMPLE 9

Injection molding of soy protein compositions prepared with hydrocolloidal gum

Compositions were formulated with soy protein isolate, glycerol, water, corn starch and various gums, as shown in TABLE 15 below.

TABLE 15[1]

| Sample | Soy Protein Isolate | Corn Starch | Water | Sodium Sulfite | Soy Bean Oil | Gum |
|---|---|---|---|---|---|---|
| 1 | 100 | 66.8 | 57.7 | 3.4 | 2.9 | 9.6[2] |
| 2 | 100 | 66.8 | 56.9 | 3.3 | 2.8 | 7.1[3] |

[1]Ingredients: by parts of total composition; ingredient sources same as listed in Table 5, except the gums.
[2]Gum 230, FMC Corporation, Gelloid LB230, locust bean gum.
[3]Gum 2001, FMC Corporation, Nutricol Kc5g konjac flower.

The ingredients were mixed together in a Brabender counterrotating twin screw extruder (Model PL 2000 plasticcorder with a twin screw mixer) extruder, at temperature zone 1/zone 2/zone 3/zone die: 110/120/108/98° C. at screw speed 16 rpm. The extrudates were granulated, dried, and the moisture content was measured as described in Example 5 above.

Each of the granulated compositions were processed by injection molding into formed articles as described in Example 5, at temperature zone 1/zone 2: 120/140° C.; screw speed 40 rpm and 1524 bar pressure.

The physical properties of the formed articles were measured as described in Example 3 above. The results are shown in TABLE 16 below.

TABLE 16

| Sample | Moisture Contents of Granulates (%) | Tensile Stress (MPa) | Elongation (%) | Young's Modulus (MPa) |
|---|---|---|---|---|
| 1 | 15.57 | 11.67 | 1.93 | 799.54 |
| 2 | 20.00 | 7.06 | 2.89 | 485.53 |

The sample compositions showed that gums could be used as a processing aid. Thus, the compositions could be processed without presence of glycerol. The injection molded articles displayed good tensile stress and great Young's Modulus, indicating highly rigid materials. However, percent elongation of the molded articles diminished.

The results show that a hydrocolloidal gum can be used in place of glycerol in injection molding of soy protein isolate with corn starch. A small quantity of gum can improve material processing and enhance hardness of the plastics and surface gloss.

EXAMPLE 10

Treatment of soy protein/starch mixtures with anhydride

Compositions were formulated with soy protein isolate, corn starch, glycerol, water, sodium sulfite, soy bean oil, and anhydride, as shown in TABLE 17 below.

TABLE 17[1]

| Sample | Soy Protein Isolate | Corn Starch | Glycerol | Water | Sodium Sulfite | Soy Bean Oil | Anhydride |
|---|---|---|---|---|---|---|---|
| 1 | 100 | 66.7 | 46.4 | 38.7 | 3.6 | 2.6 | 0 |
| 2 | 100 | 66.7 | 46.4 | 38.7 | 3.6 | 2.6 | 4.1[2] |
| 3 | 100 | 66.7 | 46.4 | 38.7 | 3.6 | 2.6 | 4.1[3] |

[1]Ingredients: by parts of total composition; ingredient sources same as listed in Table 5, except the anhydride.
[2]N-Octenylsuccinic anhydride (Morton Thiokol, Inc.)
[3]Maleic anhydride (Sigma Chemical Co.).

The ingredients were mixed together in a Brabender counterrotating twin screw extruder (Model PL 2000 plasticcorder with a twin screw mixer) extruder, at temperature zone 1/zone 2/zone 3/zone die: 110/125/116/106° C. at screw speed 16 rpm. The extrudates were dried, granulated, and the moisture content was measured as described in Example 5 above.

Each of the granulated compositions were processed by injection molding into formed articles as described in Example 5, at temperature zone 1/zone 2: 130/140° C.; screw speed 40 rpm and 1558 bar pressure.

The physical properties of the formed articles were measured as described in Example 3 above. The results are shown in TABLE 18 below.

TABLE 18

| Sample | Moisture Contents of Granulates (%) | Tensile Stress (MPa) | Elongation (%) | Young's Modulus (MPa) |
|---|---|---|---|---|
| 1 | 8.12 | 10.30 | 8.94 | 360.20 |
| 2 | 8.00 | 8.92 | 19.93 | 310.87 |
| 3 | 8.78 | 7.85 | 38.74 | 225.06 |

The results show that the mechanical properties of soy protein/starch plastics may be improved by treatment with an anhydride. The anhydride functions to add acid derivatives onto starch and protein by ester or amide linkages. The acidic derivatives function as plasticizers.

Both n-octenylsuccinic anhydride and maleic anhydride enhanced percent elongation significantly but decreased tensile stress slightly.

EXAMPLE 11

Soy protein/starch plastics combined with cellulose fiber

Compositions were formulated with 100 parts soy protein isolate, 66.7 parts corn starch, 53.2 parts glycerol, 50 parts water, 3.7 parts sodium sulfite, 2.7 parts soy bean oil, and varying amounts of cellulose fiber, 0, 7.8, 15.6, 23.4, 33.3 parts. The cellulose fiber was pretreated with the water and glycerol, which were then mixed with the soy protein isolate, starch, sodium sulfite and soy bean oil.

The mixture was then blended together in a Brabender counterrotating twin screw extruder (Model PL 2000 plasticcorder with a twin screw mixer) extruder, at temperature zone 1/zone 2/zone 3/zone die: 115/125/116/103° C. at screw speed 20 rpm. The extrudates were granulated, dried and the moisture content was measured as described in Example 5 above.

Each of the granulated compositions were processed by injection molding into formed articles as described in Example 5, at temperature zone 1/zone 2: 130/140° C.; screw speed 40 rpm and 1558 bar pressure.

The physical properties of the formed articles were measured as described in Example 3 above. The results are shown in TABLE 19 below.

TABLE 19

| Sample | Cellulose Fiber (parts) | Moisture Content of Granulates (%) | Mechanical Properties | | |
|---|---|---|---|---|---|
| | | | Tensile Stress (MPa) | Elongation (%) | Young's Modulus (MPa) |
| 1 | 0 | 10.79 | 5.09 | 72.80 | 62.59 |
| 2 | 7.8 | 10.50 | 7.77 | 35.99 | 126.10 |
| 3 | 15.6 | 9.60 | 13.38 | 20.63 | 280.40 |
| 4 | 23.4 | 10.20 | 14.17 | 18.52 | 283.40 |
| 5 | 33.3 | 10.40 | 18.95 | 17.63 | 407.30 |

The results show that the mechanical properties of soy protein/starch plastics may be improved by reinforcing the mixture with cellulose fiber.

Cellulose fiber enhanced tensile stress, hardness, dimensional stability and water resistance of the plastics. The incorporation of cellulose fiber further reduce product costs, and the resulting plastics are fully biodegradable.

What is claimed is:

1. A biodegradable, soy protein thermoplastic composition, comprising the reaction mixture of:
   (a) about 25–65 wt-% soy protein;
   (b) about 30–40 wt-% starch filler;
   (c) about 5–35 wt-% plasticizer;
   (d) about 0.5–2.5 wt-% reducing agent; and
   (e) about 5–35 wt-% water;
   the composition having a flowability suitable for processing and forming a solid article by extrusion, injection molding, or a combination thereof.

2. The soy protein thermoplastic composition according to claim 1, wherein the soy protein is a soy protein concentrate, soy protein isolate, or a combination thereof.

3. The soy protein thermoplastic composition according to claim 1, further comprising a plant-derived protein selected from the group consisting of gluten, zein, hordein, kafirin, avenin, and any combination thereof.

4. The soy protein thermoplastic composition according to claim 1, further comprising a animal-derived protein selected from the group consisting of collagen, casein, albumin, gelatin, keratin, and any combination thereof.

5. The soy protein thermoplastic composition according to claim 1, further comprising a protein derived from a microorganism selected from the group consisting of beer yeast, baker's yeast, and any combination thereof.

6. The soy protein thermoplastic composition according to claim 1, wherein the starch filler is a native starch isolated from a natural starch source, a chemically-modified starch, a pregelatinized starch, and a combination thereof.

7. The soy protein thermoplastic composition according to claim 6, wherein the starch filler is a native starch selected from the group consisting of corn starch, potato starch, wheat starch, rice starch, waxy maize starch, waxy rice starch, high amylose corn starch, tapioca starch, oat starch, rye starch, barley starch, sorghum starch, mung bean starch, sweet potato starch, and any combination thereof.

8. The soy protein thermoplastic composition according to claim 6, wherein the starch filler is a chemically-modified starch selected from the group consisting of starch acetate, starch maleate, starch octenylsuccinate, carboxymethyl starch, hydroxyethyl starch, hydroxypropyl starch, methyl starch, ethyl starch, methyl hydroxyethyl starch, ethylhydroxypropyl starch, starch phosphate, starch propionamide, oxidized starch, cationic starch, starch succinate, and any combination thereof.

9. The soy protein thermoplastic composition according to claim 1, wherein the plasticizer is selected from the group consisting of glycerol, triethylene glycol, urea, glycerol monoacetate, glycerol diacetate, glycerol triacetate, sorbitol, sorbitan, mannitol, maltitol, ethylene glycol, propylene glycol, polyvinyl alcohol, sodium cellulose glycolate, cellulose methyl ether, sodium alginate, sodium diethysuccinate, triethyl citrate, polyethylene glycol, polypropylene glycol, polyethylene propylene glycol, and mixtures thereof.

10. The soy protein thermoplastic composition according to claim 1, wherein the reducing agent is selected from the group consisting of sodium sulfite, sodium bisulfite, potassium sulfite, potassium bisulfite, sodium nitrite, sodium hydrosulfite, sodium pyrosulfite, potassium hydrosulfite, potassium pyrosulfite, ammonium sulfite, mercaptoethanol, cysteine, L-cysteine hydrochloride, cysteamine, L-cysteine tartrate, di-L-cysteine sulfite, ascorbic acid, hydrogen sulfide, glutathione, and combinations thereof.

11. The soy protein thermoplastic composition according to claim 1, further comprising a hydrocolloidal gum selected from the group consisting of locust bean gum, xanthan gum, guar gum, carrageenan, and mixtures thereof.

12. The soy protein thermoplastic composition according to claim 1, further comprising a cellulosic extender.

13. The soy protein thermoplastic composition according to claim 12, wherein the cellulosic extender is a cellulose fiber.

14. The soy protein thermoplastic composition according to claim 12, wherein the cellulosic extender is a cellulose ether selected from the group consisting of methylcellulose, carboxymethylcellulose, hydroxymethylcellulose, hydroxypropylcellulose, sodium carboxymethylcellulose, and any combination thereof.

15. The soy protein thermoplastic composition according to claim 12, wherein the cellulosic extender is microcrystalline cellulose.

16. The soy protein thermoplastic composition according to claim 1, further comprising a lubricating agent.

17. The soy protein thermoplastic composition according to claim 16, wherein the lubricating agent is selected from the group consisting of soybean oil, lecithin, monoglyceride, diglyceride, fatty acids, vegetable oil, phosphoric acid derivative of the esters of polyhydroxy compounds, animal lipid, petroleum silicone, mineral oils, and any combination thereof.

18. The soy protein thermoplastic composition according to claim 16, wherein the lubricating agent is soybean oil, lecithin, or a combination thereof.

19. The soy protein thermoplastic composition according to claim 1, further comprising an anhydride selected from the group consisting of n-octenylsuccinic anhydride, maleic anhydride, succinic anhydride, and any combination thereof.

20. The soy protein thermoplastic composition according to claim 1, further comprising a coloring agent.

21. The soy protein thermoplastic composition according to claim 1, having a torque of about 1500–2000 mg.

22. The thermoplastic composition according to claim 1, having a tensile strength of about 5–20 megapascals.

23. A solid, biodegradable article formed from the thermoplastic composition according to claim 1.

24. The article according to claim 23, wherein the article is formed by injection molding.

25. The article according to claim 24, wherein the article is formed by compression molding, blow molding, rotation molding, transfer molding, extrusion molding, vacuum forming, pressure forming, or inflation molding.

* * * * *

UNITED STATES PATENT AND TRADEMARK OFFICE
CERTIFICATE OF CORRECTION

PATENT NO. : 5,523,293

DATED : June 4, 1996

INVENTOR(S) : Jane et al.

It is certified that error appears in the above-identified patent and that said Letters Patent is hereby corrected as shown below:

At cols. 9-10, in Table 2 (sample 1 under "Torque"), " >5006" should read -- >5000--.

At col. 14, in Table 13 (sample 3 under "... Corn Starch"), "66.64" should read --$66.6^4$--.

Signed and Sealed this

Eighth Day of October, 1996

Attest:

BRUCE LEHMAN

Attesting Officer     Commissioner of Patents and Trademarks